(12) United States Patent
Ren et al.

(10) Patent No.: US 8,876,944 B2
(45) Date of Patent: Nov. 4, 2014

(54) DOWNHOLE FLUID SEPARATION SYSTEM AND METHOD

(75) Inventors: Jiaxiang Ren, Houston, TX (US); David P. Gerrard, Magnolia, TX (US); John C. Welch, Spring, TX (US); James E. Goodson, Porter, TX (US)

(73) Assignee: Baker Hughes Incorporated, Houston, TX (US)

( * ) Notice: Subject to any disclaimer, the term of this patent is extended or adjusted under 35 U.S.C. 154(b) by 182 days.

(21) Appl. No.: 13/350,053

(22) Filed: Jan. 13, 2012

(65) Prior Publication Data

US 2013/0180401 A1    Jul. 18, 2013

(51) Int. Cl.
  *B01D 19/00* (2006.01)
  *B01D 53/22* (2006.01)
  *B82Y 30/00* (2011.01)

(52) U.S. Cl.
  USPC .............. 95/46; 95/50; 95/241; 96/6; 96/155; 96/219; 977/734; 977/742

(58) Field of Classification Search
  USPC ............ 95/46, 241, 50; 96/4, 6, 11, 155, 219; 977/734, 742; 166/227, 228
  See application file for complete search history.

(56) References Cited

U.S. PATENT DOCUMENTS

| | | | |
|---|---|---|---|
| 4,177,146 A | 12/1979 | Popper et al. | |
| 5,019,422 A * | 5/1991 | Rose et al. | 96/6 |
| 5,673,752 A * | 10/1997 | Scudder et al. | 166/265 |
| 6,245,955 B1 | 6/2001 | Smith | |
| 2002/0056369 A1 * | 5/2002 | Koros et al. | 95/51 |
| 2005/0205256 A1 | 9/2005 | DiFoggio | |
| 2010/0314118 A1 * | 12/2010 | Quintero et al. | 166/308.1 |
| 2011/0067872 A1 * | 3/2011 | Agrawal | 166/302 |
| 2011/0232901 A1 | 9/2011 | Carrejo et al. | |
| 2012/0285320 A1 * | 11/2012 | Heald et al. | 95/51 |

FOREIGN PATENT DOCUMENTS

WO      01/66232 A1    9/2001

OTHER PUBLICATIONS

P.H.J. Verbeek et al., "Downhole separator produces less water and more oil," Society of Petroleum Engineers (SPE 50617); 1998, Conference paper prepared for presentation at the 1998 SPE European Petroleum Conference held in The Hague, The Netherlands, Oct. 20-22, 1998, pp. 429-434.

International Search Report and Written Opinion; International Application No. PCT/US2012/069533; International Filing Date: Dec. 13, 2012; Date of Mailing: Mar. 28, 2013; 10 pages.

* cited by examiner

*Primary Examiner* — Jason M Greene
(74) *Attorney, Agent, or Firm* — Cantor Colburn LLP

(57) ABSTRACT

A system for separating fluids of a fluid mixture including a filter element operatively arranged for enabling a first component of a fluid mixture to flow therethrough while impeding flow of at least one other fluid component of the fluid mixture. An additive is configured to improve a first affinity of the filter element for the first component relative to a second affinity of the filter element for the at least one other fluid component of the fluid mixture. A method of separating fluids is also included.

25 Claims, 3 Drawing Sheets

DOWNHOLE FLUID SEPARATION SYSTEM AND METHOD

BACKGROUND

The separation of fluid components, e.g., gas from liquid components in a downhole fluid mixture is at times desired in the downhole drilling and completions industry. Fluids can be separated from the fluid mixture once it has been produced, but this of course requires production of the entire fluid mixture, which is not always desired. Some systems are known and utilized in the art for achieving downhole fluid separation, but are not tailorable to maximize efficiency of the fluid separation process with respect to particular downhole fluid mixtures (e.g., high water or oil content, etc.) or conditions (e.g., temperature, pressure, etc.). In view of the foregoing, the industry well receives advances and alternatives in downhole fluid separation technology.

BRIEF DESCRIPTION

A system for separating fluids of a fluid mixture including a filter element operatively arranged for enabling a first component of a fluid mixture to flow therethrough while impeding flow of at least one other fluid component of the fluid mixture and an additive configured to improve a first affinity of the filter element for the first component relative to a second affinity of the filter element for the at least one other fluid component of the fluid mixture.

A method of separating fluids including disposing a filter element in a downhole fluid mixture including a first component and at least one other fluid component, modifying a relative difference between a first affinity of the filter element for the first component and a second affinity of the filter element for the at least one other fluid component, and flowing the first component through the filter element while impeding passage of the at least one other fluid component therethrough for separating the first component from the fluid mixture.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
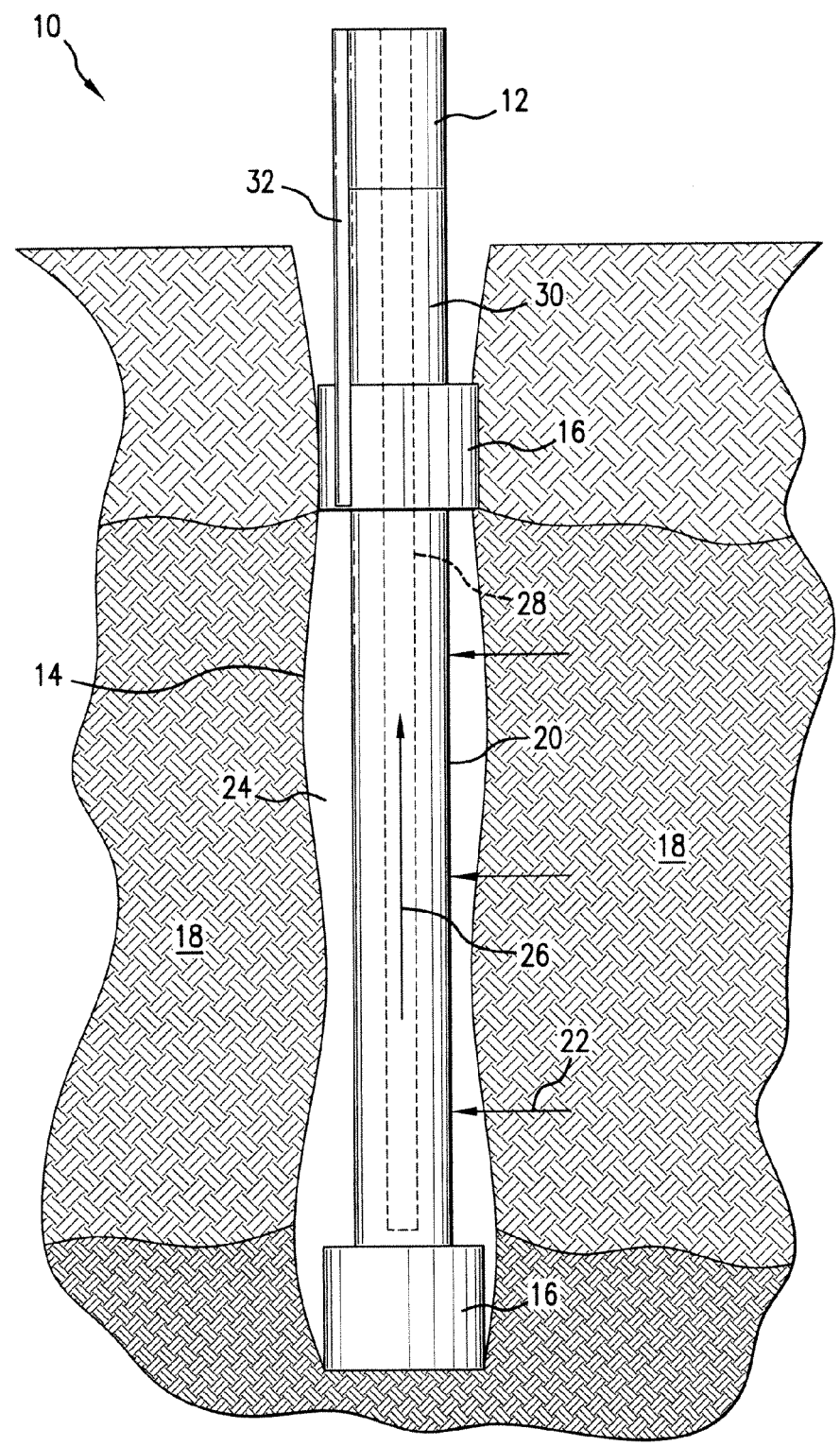
FIG. 1 schematically illustrates a gas separation system.

Referring now to FIG. 1, a fluid separation system 10 is illustrated. The system 10 includes, e.g., a string 12 run in a borehole 14. In the illustrated embodiment, the string 12 includes a pair of packers or other elements for sealing and/or isolating a zone 18 through which the borehole 14 is formed. The zone 18 is, for example, a production zone that contains a fluid mixture having at least one component that is desired for production. In one embodiment, the desired component is gaseous, e.g., natural gas.

In order to separate the desirable component from the other fluid components of the fluid mixture in the zone 18, the string 12 includes a filter element 20. The filter element 20 is arranged to preferentially enable the desirable component to flow therethrough while impeding the flow of the other fluid components. The filter element 20 is, for example, a foam or porous media. The fluid mixture, as indicated by a set of arrows 22, will flow into an annulus 24 between the filter element 20 and the borehole 14. Once in contact with the filter element 20, due to the properties of the filter element 20 discussed in more detail below, the desirable component (indicated by an arrow 26) will flow into a passageway 28 of the string 12 where it can be, e.g., produced or directed up-hole to a surface of the borehole 14. For example, in one embodiment, the string 12 comprises production tubing and includes a gas lift pump and/or pressure controller 30 for assisting in production of a gas component.

The filter element 20 is preferably selected so that it has a greater affinity toward the desirable component than the other fluid components of the fluid mixture. By affinity it is meant that the desirable component more readily flows through the filter than the other fluid components under a given set of conditions (e.g., temperature, pressure, etc.). In general, production of a hydrocarbon from an at least partially aqueous mixture can be achieved if the material of the filter element 20 is selected to be hydrophobic and vice-versa. In one embodiment, gas separation from a fluid mixture is achieved by selecting a material of the filter element 20 having a suitable relative difference between affinities for gas and liquid phases. For example, if the filter element 20 is used in a zone including a hydrocarbon fluid mixture with both gas and liquid phases, the gas component can be separated from the liquid component by making the filter element 20 highly oleophobic, as gases, even hydrocarbon gases, will more readily flow through a oleophobic filter than liquid hydrocarbons. Similarly, aqueous liquid components can be impeded while gaseous components are produced by providing the filter element 20 with a high hydrophobicity. Polytetrafluoroethylene (PTFE) and other fluoropolymer foams exhibit good hydrophobicity due to their extremely low surface energies and are modifiable to become oleophobic, and are thus suitable candidates for the material of the filter element 20 in a variety of downhole applications.

Additionally or alternatively, the surface properties of the filter element 20 desirable for gas separation (e.g., oleophobicity, hydrophobicity, etc.) can be tailored or fine-tuned for improving performance in various downhole environments. For example, the performance of even PTFE and other very low surface energy foams to separate various fluid components effectively is adversely affected when under high pressure. Alternatively stated, the affinity of the filter element 20 for the desirable component will be improved or increased relative to its affinity for the other fluid components. For example, the affinity for the desirable component could be increased, the affinity for the other fluid components decreased, or combinations thereof. Specifically, according to the current invention an additive is included that enables the surface properties of the filter element 20 and/or the fluid mixture to be tailored or tuned for improving the affinity of the filter element 20 for the desirable component relative to its affinity for the other fluid components.

In one embodiment, the additive comes in the form of one or more chemical substances that is injected into the fluid mixture. For example, in FIG. 1, an injection line 32 is included with the string 12 for injecting chemicals into the annulus 24 for altering the properties of the fluid mixture and/or the surface of the filter element 20 and making conditions for favorable for fluid separation. For example, in one embodiment the chemical additives are injected to increase a surface tension of the fluid mixture or undesirable components thereof. By increasing the surface tension of undesirable liquid components, for example, the contact angle that the liquid components form with respect to the filter element 20 is increased, thereby adversely affecting the ability for the liquid components to pass through the filter element 20. For example, chemicals that will increase the surface tension of water include salts and other inorganic solutes, while surfactants and alcohols will generally have the opposite effect. Surface tensions of many liquids will also increase as temperature decreases. Influence of a chemical additive could cause an endothermic reaction in the annulus 24, which will facilitate the gas/liquid separation (e.g., adding potassium chloride to an at least partially aqueous downhole fluid mixture). Accordingly, addition of these and other chemical additives will make it less favorable for the liquid components to pass through the filter element 20, and therefore, the affinity of the filter element 20 for the component will be relatively improved.

In another embodiment, the filter element 20 or portions thereof could be modified by an additive. For example, in one embodiment Nafion could be used to chemically modify, e.g., reduce, the surface tension of the filter element 20 for making it less favorable for liquid components to flow therethrough. In another embodiment, the filter element 20 comprises nanoparticles or filler particles for tailoring the surface properties of the filter element 20, e.g., hydrophobicity, oleophobicity, surface area, etc. in order to increase the affinity of the filter element 20 to the desirable component and/or decrease the affinity to the other fluid components.

According to an embodiment, the filter element 20 includes an open cell foam body and nanoparticles disposed in the open cell foam. The nanoparticles can be exposed within pores of the open cell foam. Additionally, the nanoparticles can be disposed among the chains of a polymer contained in the open cell foam to be unexposed in the pores of the open cells. The open cell foam includes a base polymer and nanoparticles. The nanoparticles can be non-derivatized or derivatized to include chemical functional groups to increase wettability (e.g., hydrophobicity, hydrophilicity, etc.), dispersibility, reactivity, surface properties, compatibility, and other desirable properties. Combinations comprising derivatized and non-derivatized nanoparticles can also be used.

In an embodiment, the nanoparticles are non-derivatized, derivatized with functional groups, or a combination comprising at least one of the foregoing. Nanoparticles, from which the derivatized nanoparticles are formed, are generally particles having an average particle size, in at least one dimension, of less than one micrometer (μm). As used herein "average particle size" refers to the number average particle size based on the largest linear dimension of the particle (sometimes referred to as "diameter"). Particle size, including average, maximum, and minimum particle sizes, may be determined by an appropriate method of sizing particles such as, for example, static or dynamic light scattering (SLS or DLS) using a laser light source. Nanoparticles may include both particles having an average particle size of 250 nanometers (nm) or less, and particles having an average particle size of greater than 250 nm to less than 1 μm (sometimes referred in the art as "sub-micron sized" particles). In an embodiment, a nanoparticle may have an average particle size of about 0.5 nm to about 500 nm, specifically about 0.5 nm to about 250 nm, more specifically about 0.5 nm to about 150 nm, even more specifically about 0.5 nm to about 125 nm, and still more specifically about 1 nm to about 75 nm. The nanoparticles may be monodisperse, where all particles are of the same size with little variation, or polydisperse, where the particles have a range of sizes and are averaged. Generally, polydisperse nanoparticles are used. Nanoparticles of different average particle size may be used, and in this way, the particle size distribution of the nanoparticles may be unimodal (exhibiting a single distribution), bimodal exhibiting two distributions, or multi-modal, exhibiting more than one particle size distribution.

The minimum particle size for the smallest 5 percent of the nanoparticles may be less than 1 nm, specifically less than or equal to 0.8 nm, and more specifically less than or equal to 0.7 nm. Similarly, the maximum particle size for 95% of the nanoparticles is greater than or equal to 900 nm, specifically greater than or equal to 750 nm, and more specifically greater than or equal to 500 nm.

The nanoparticles have a high surface area of greater than 300 m$^2$/g, and in a specific embodiment, 300 m$^2$/g to 1800 m$^2$/g, specifically 500 m$^2$/g to 1500 m$^2$/g.

The nanoparticles disclosed herein comprise a fullerene, a nanotube, nanographite, nanographene, graphene fiber, nanodiamonds, polysilsesquioxanes, silica nanoparticles, nano clay, metal particles, ceramic particles, or a combination comprising at least one of the foregoing.

Fullerenes, as disclosed herein, may include any of the known cage-like hollow allotropic forms of carbon possessing a polyhedral structure. Fullerenes may include, for example, from about 20 to about 100 carbon atoms. For example, $C_{60}$ is a fullerene having 60 carbon atoms and high symmetry ($D_{5h}$), and is a relatively common, commercially available fullerene. Exemplary fullerenes may include $C_{30}$, $C_{32}$, $C_{34}$, $C_{38}$, $C_{40}$, $C_{42}$, $C_{44}$, $C_{46}$, $C_{48}$, $C_{50}$, $C_{52}$, $C_{60}$, $C_{70}$, $C_{76}$, and the like.

Nanotubes can include carbon nanotubes, inorganic nanotubes, metallated nanotubes, or a combination comprising at least one of the foregoing. Carbon nanotubes are tubular fullerene structures having open or closed ends, can be inorganic or made entirely or partially of carbon, and can include other components such as metals or metalloids. Nanotubes, including carbon nanotubes, can be single walled nanotubes (SWNTs) or multi-walled nanotubes (MWNTs).

Nanographite is a cluster of plate-like sheets of graphite, in which a stacked structure of one or more layers of graphite, which has a plate-like two dimensional structure of fused hexagonal rings with an extended delocalized π-electron system, are layered and weakly bonded to one another through π-π stacking interaction. Nanographite has both micro- and nano-scale dimensions, such as for example an average particle size of 1 to 20 μm, specifically 1 to 15 μm; and an average thickness (smallest) dimension in nano-scale dimensions of less than 1 μm, specifically less than or equal to 700 nm, and still more specifically less than or equal to 500 nm.

In an embodiment, the nanoparticle is a graphene including nanographene and graphene fibers (i.e., graphene particles having an average largest dimension of greater than 1 mm and an aspect ratio of greater than 10, where the graphene particles form an interbonded chain). Graphene and nanographene, as disclosed herein, are effectively two-dimensional particles of nominal thickness, having of one or more layers of fused hexagonal rings with an extended delocalized π-electron system, layered and weakly bonded to one another through π-π stacking interaction. Graphene in general, and including nanographene, may be a single sheet or a stack of several sheets having both micro- and nano-scale dimensions, such as in some embodiments an average particle size of 1 to 20 μm, specifically 1 to 15 μm, and an average thickness (smallest) dimension in nano-scale dimensions of less than or equal to 50 nm, specifically less than or equal to 25 nm, and more specifically less than or equal to 10 nm. An exemplary nanographene can have an average particle size of 1 to 5 μm, and specifically 2 to 4 μm. In addition, smaller nanoparticles or sub-micron sized particles as defined above may be combined with nanoparticles having an average particle size of greater than or equal to 1 μm. In a specific embodiment, the derivatized nanoparticle is a derivatized nanographene.

Graphene, including nanographene, may be prepared by exfoliation of nanographite or by a synthetic procedure by "unzipping" a nanotube to form a nanographene ribbon, followed by derivatization of the nanographene to prepare, for example, nanographene oxide.

Exfoliation to form graphene or nanographene may be carried out by exfoliation of a graphite source such as graphite, intercalated graphite, and nanographite. Exemplary exfoliation methods include, but are not limited to, those practiced in the art such as fluorination, acid intercalation, acid intercalation followed by thermal shock treatment, and the like, or a combination comprising at least one of the foregoing. Exfoliation of the nanographite provides a nanographene having fewer layers than non-exfoliated nanographite. It will be appreciated that exfoliation of nanographite may provide the nanographene as a single sheet only one molecule thick, or as a layered stack of relatively few sheets. In an embodiment, exfoliated nanographene has fewer than 50 single sheet layers, specifically fewer than 20 single sheet layers, specifically fewer than 10 single sheet layers, and more specifically fewer than 5 single sheet layers.

Polysilsesquioxanes, also referred to as polyorganosilsesquioxanes or polyhedral oligomeric silsesquioxanes (POSS) derivatives are polyorganosilicon oxide compounds of general formula $RSiO_{1.5}$ (where R is an organic group such as methyl) having defined closed or open cage structures (closo or nido structures). Polysilsesquioxanes, including POSS structures, may be prepared by acid and/or base-catalyzed condensation of functionalized silicon-containing monomers such as tetraalkoxysilanes including tetramethoxysilane and tetraethoxysilane, and alkyltrialkoxysilanes such as methyltrimethoxysilane and methyltrimethoxysilane.

Nanoclays can be used in the open cell foam. Nanoclays may be hydrated or anhydrous silicate minerals with a layered structure and may include, for example, alumino-silicate clays such as kaolins including hallyosite, smectites including montmorillonite, illite, and the like. Exemplary nanoclays include those marketed under the tradename CLOISITE® marketed by Southern Clay Products, Inc. As another example, the nanoclays can be functionalized, e.g., by quarternary ammonium salt, in order to adjust the hydrophobicity (to decrease the hydrophobicity in the case of quarternary ammonium salt). CLOISITE® 15A is an example of a natural montmorillonite modified with a quaternary ammonium salt and is also commercially available from Southern Clay Products, Inc. Nanoclays can be exfoliated to separate individual sheets, can be non-exfoliated, and further, can be dehydrated or included as hydrated minerals. Other nano-sized mineral fillers of similar structure may also be included such as, for example, talc, micas including muscovite, phlogopite, or phengite, or the like.

Inorganic nanoparticles such as ceramic particles can also be included in the open cell foam. Exemplary inorganic nanoparticles may include a metal or metalloid carbide such as tungsten carbide, silicon carbide, boron carbide, or the like; a metal of metalloid oxide such as alumina, silica, titania, zirconia, or the like; a metal or metalloid nitride such as titanium nitride, boron nitride, silicon nitride, or the like; and/or a metal nanoparticle such as iron, tin, titanium, platinum, palladium, cobalt, nickel, vanadium, alloys thereof, or a combination comprising at least one of the foregoing.

A nanodiamond is a diamond particle having an average particle size of less than 1 μm. Nanodiamonds are from a naturally occurring source, such as a by-product of milling or other processing of natural diamonds, or are synthetic and are prepared by any suitable method such as commercial methods involving detonation synthesis of nitrogen-containing carbon compounds (e.g., a combination of trinitrotoluene (TNT) and cyclotrimethylenetrinitramine (RDX)).

The nanoparticles used herein can be derivatized to include functional groups such as, for example, carboxy (e.g., carboxylic acid groups), epoxy, ether, ketone, amine, hydroxy, alkoxy, alkyl, aryl, aralkyl, alkaryl, lactone, functionalized polymeric or oligomeric groups, or a combination comprising at least one of the forgoing functional groups. The nanoparticles, including nanographene after exfoliation, are derivatized to introduce chemical functionality to the nanoparticle. For example, for nanographene, the surface and/or edges of the nanographene sheet is derivatized to increase dispersibility in and interaction with the polymer matrix. In an embodiment, the derivatized nanoparticle may be hydrophilic, hydrophobic, olephilic, olephobic, oxophilic, lipophilic, or may possess a combination of these properties to provide a balance of desirable net properties, by use of different functional groups.

In an embodiment, the nanoparticle is derivatized by, for example, amination to include amine groups, where amination may be accomplished by nitration followed by reduction, or by nucleophilic substitution of a leaving group by an amine, substituted amine, or protected amine, followed by deprotection as necessary. In another embodiment, the nanographene can be derivatized by oxidative methods to produce an epoxy, hydroxy group or glycol group using a peroxide, or by cleavage of a double bond by, for example, a metal mediated oxidation such as a permanganate oxidation to form ketone, aldehyde, or carboxylic acid functional groups.

Where the functional groups for the derivatized nanoparticles are alkyl, aryl, aralkyl, alkaryl, functionalized polymeric or oligomeric groups, or a combination of these groups, the functional groups can be attached (a) directly to the derivatized nanoparticle by a carbon-carbon bond without intervening heteroatoms, to provide greater thermal and/or chemical stability to the derivatized nanoparticle as well as a more efficient synthetic process requiring fewer steps; (b) by a carbon-oxygen bond (where the nanoparticle contains an oxygen-containing functional group such as hydroxy or carboxylic acid); or (c) by a carbon-nitrogen bond (where the nanoparticle contains a nitrogen-containing functional group such as amine or amide). In an embodiment, the nanoparticle can be derivatized by a metal mediated reaction with a $C_{6-30}$ aryl or $C_{7-30}$ aralkyl halide (F, Cl, Br, I) in a carbon-carbon bond forming step, such as by a palladium-mediated reaction such as the Stille reaction, Suzuki coupling, or diazo coupling, or by an organocopper coupling reaction. In another embodiment, a nanoparticle, such as a fullerene, nanotube, nanodiamond, or nanographene, may be directly metallated by reaction with, e.g., an alkali metal such as lithium, sodium, or potassium, followed by reaction with a $C_{1-30}$ alkyl or $C_{7-30}$ alkaryl compound with a leaving group such as a halide (Cl, Br, I) or other leaving group (e.g., tosylate, mesylate, etc.) in a carbon-carbon bond forming step. The aryl or aralkyl halide, or the alkyl or alkaryl compound, may be substituted with a functional group such as hydroxy, carboxy, ether, or the like. Exemplary groups include, for example, hydroxy groups, carboxylic acid groups, alkyl groups such as methyl, ethyl, propyl, butyl, pentyl, hexyl, octyl, dodecyl, octadecyl, and the like; aryl groups including phenyl and hydroxyphenyl; aralkyl groups such as benzyl groups attached via the aryl portion, such as in a 4-methylphenyl, 4-hydroxymethylphenyl, or 4-(2-hydroxyethyl)phenyl (also referred to as a phenethylalcohol) group, or the like, or aralkyl groups attached at the benzylic (alkyl) position such as found in a phenylmethyl or 4-hydroxyphenyl methyl group, at the 2-position in a phenethyl or 4-hydroxyphenethyl group, or the like. In an exemplary embodiment, the derivatized nanoparticle is nanographene substituted with a benzyl, 4-hydroxybenzyl, phenethyl, 4-hydroxyphenethyl, 4-hydroxymethylphenyl, or 4-(2-hydroxyethyl)phenyl group or a combination comprising at least one of the foregoing groups.

In another embodiment, the nanoparticle can be further derivatized by grafting certain polymer chains to the functional groups. For example, polymer chains such as acrylic chains having carboxylic acid functional groups, hydroxy functional groups, and/or amine functional groups; polyamines such as polyethyleneamine or polyethyleneimine; and poly(alkylene glycols) such as poly(ethylene glycol) and poly(propylene glycol), may be included by reaction with functional groups.

The functional groups of the derivatized nanoparticle may react directly with other components in the open cell foam, including reactive functional groups that may be present in the base polymer, other polymers (if present), or monomeric constituents, leading to improved tethering/reaction of the derivatized nanoparticle with the polymeric matrix. Where the nanoparticle is a carbon-based nanoparticle such as nanographene, a carbon nanotube, nanodiamond, or the like, the degree of derivatization for the nanoparticles can vary from 1 functional group for every 5 carbon centers to 1 functional group for every 100 carbon centers, depending on the functional group.

In an embodiment, in addition to the nanoparticles, the open cell foam can include filler particles such as carbon black, mica, clays such as e.g., montmorillonite clays, silicates, glass fiber, carbon fiber, and the like, and combinations comprising at least one of the foregoing fillers.

Exemplary base polymers include fluoropolymers, such as, for example, high fluorine content fluoroelastomers rubbers such as ethylene tetrafluoroethylene (ETFE, available under the tradename Teflon® ETFE), fluorinated ethylene propylene (FEP, available under the tradename Teflon® FEP from DuPont), perfluoroalkoxy (PFA, available under the tradename Teflon® PFA from DuPont), polyvinylidene fluoride (PVDF, available under the tradename Hylar from Solvay Solexis S.p.A.), polychlorotrifluoroethylene (available under the tradename Neoflon® from Daikin Industries, Ltd.), ethylene chlorotrifluoroethylene (ECTFE, available under the tradename Halar ECTFE from Solvay Solexis S.p.A.), and those in the FKM family and marketed under the tradename VITON® (available from FKM-Industries); and perfluoroelastomers such as polytetrafluoroethylene (PTFE, available under the tradename Teflon® from DuPont), FFKM (also available from FKM-Industries) and also marketed under the tradename KALREZ® perfluoroelastomers (available from DuPont), and VECTOR® adhesives (available from Dexco LP). One of ordinary skill in the art will recognize that a myriad of other polymers are similarly modifiable with nanoparticles according to the instant disclosure, including but not limited to, polyurethane; phenolic resins such as those prepared from phenol, resorcinol, o-, m- and p-xylenol, o-, m-, or p-cresol, and the like, and aldehydes such as formaldehyde, acetaldehyde, propionaldehyde, butyraldehyde, hexanal, octanal, dodecanal, benzaldehyde, salicylaldehyde, where exemplary phenolic resins include phenol-formaldehyde resins; epoxy resins such as those prepared from bisphenol A diepoxide, polyether ether ketones (PEEK), bismaleimides (BMI), nylons such as nylon-6 and nylon 6,6, polycarbonates such as bisphenol A polycarbonate, nitrile-butyl rubber (NBR), hydrogenated nitrile-butyl rubber (HNBR); organopolysiloxanes such as functionalized or unfunctionalized polydimethylsiloxanes (PDMS); tetrafluoroethylene-propylene elastomeric copolymers such as those marketed under the tradename AFLAS® and marketed by Asahi Glass Co.; ethylene-propylene-diene monomer (EPDM) rubbers; polyethylene; polyvinylalcohol (PVA); and the like. Combinations of these polymers may also be used.

In an embodiment, the open cell foam includes (in addition to the base polymer, e.g., PTFE or one of the fluoropolymers discussed above) an additional polymer to obtain mechanical and/or chemical properties effective for use of the open cell foam downhole, i.e., the additional polymer may be any polymer useful for forming a nanocomposite for downhole applications. The additional polymer can provide a hydrophobic or hydrophilic property to the open cell foam as well as providing elasticity or rigidity at a certain temperature. For example, the additional polymer may comprise polyphenylene sulfide (PPS), polyphenylsulfone (PPSU), polyether ether ketones (PEEK), tetrafluoroethylene-propylene elastomeric copolymer, polyimide, a fluoroelastomer, perfluoroelastomer, hydrogenated nitrile butyl rubber, ethylene-propylene-diene monomer (EPDM) rubber, silicone, epoxy, polyetheretherketone, bismaleimide, polyethylene, polyvinyl alcohol, phenolic resin, nylon, polycarbonate, polyester, or a combination comprising at least one of the foregoing polymers. Of course, these are just examples and other polymers known in the art could also be utilized for tailoring the hydrophobicity or other properties of the foam.

The nanoparticles may be formulated as a solution or dispersion and cast or coated, or may be mechanically dispersed in a polymer resin matrix. Blending and dispersion of the nanoparticles and the polymer resin may be accomplished by methods such as, for example, extrusion, high shear mixing, rotational mixing, three roll milling, and the like.

Mixing the nanoparticle, which can be derivatized, with a reactive monomer of the base polymer can be accomplished by rotational mixing, or by a reactive injection molding-type process using two or more continuous feed streams, in which the nanoparticles may be included as a component of one of the feed streams. Mixing in such continuous feed systems is accomplished by the flow within the mixing zone at the point of introduction of the components. The nanoparticles can be mixed with the reactive monomers prior to a two-fold increase in the viscosity of the reactive monomer mixture, where including the nanoparticles prior to the increase in viscosity ensures uniform dispersion of the nanoparticles.

The properties of the open cell foam can be adjusted by the selection of the nanoparticles; for example, plate-like derivatized nanographene may be arranged or assembled with the base polymer by taking advantage of the intrinsic surface properties of the nanographene after exfoliation, in addition to the functional groups introduced by derivatization.

In the open cell foam, nanoparticles can be present in an amount of about 0.01 wt. % to about 30 wt. %, specifically about 0.05 wt. % to about 27 wt. %, more specifically about 0.1 wt. % to about 25 wt. %, even more specifically about 0.25 wt. % to about 22 wt. %, and still more specifically about 0.5 wt. % to about 20 wt. %, based on the total weight of the open cell foam.

In a specific embodiment, the open cell foam includes a PTFE resin, and 0.05 wt. % to 20 wt. % of a nanoparticle based on the total weight of the open cell foam. In another specific embodiment, the open cell foam includes a PTFE resin, and 0.05 to 20 wt. % of a derivatized nanodiamond based on the total weight of the open cell foam, the derivatized nanodiamond including functional groups comprising carboxy, epoxy, ether, ketone, amine, hydroxy, alkoxy, alkyl, aryl, aralkyl, alkaryl, lactone, functionalized polymeric or oligomeric groups, or a combination comprising at least one of the forgoing functional groups.

The base polymer, e.g., PTFE or some other fluoropolymer, and derivatized nanoparticles can be formed into a dispersion to facilitate processing. The solvent may be an inorganic solvent such as water, including deionized water, or buffered or pH adjusted water, mineral acid, or a combination comprising at least one of the foregoing, or an organic solvent comprising an alkane, alcohol, ketone, oils, ethers, amides, sulfones, sulfoxides, or a combination comprising at least one of the foregoing.

Exemplary inorganic solvents include water, sulfuric acid, hydrochloric acid, or the like; exemplary oils include mineral oil, silicone oil, or the like; and exemplary organic solvents include alkanes such as hexane, heptane, 2,2,4-trimethylpentane, n-octane, cyclohexane, and the like; alcohols such as methanol, ethanol, propanol, isopropanol, butanol, t-butanol, octanol, cyclohexanol, ethylene glycol, ethylene glycol methyl ether, ethylene glycol ethyl ether, ethylene glycol butyl ether, propylene glycol, propylene glycol methyl ether, propylene glycol ethyl ether, and the like; ketones such as acetone, methyl-ethyl ketone, cyclohexanone methylethylketone, 2-heptanone, and the like; esters such as ethyl acetate, propylene glycol methyl ether acetate, ethyl lactate, and the like; ethers such as tetrahydrofuran, dioxane, and the like; polar aprotic solvents such as N,N-dimethylformamide, N-methylcaprolactam, N-methylpyrrolidine, dimethylsulfoxide, gamma-butyrolactone, or the like; or a combination comprising at least one of the foregoing.

The base polymer, derivatized nanoparticles, and any solvent may be combined by extrusion, high shear mixing, three-roll mixing, rotational mixing, or solution mixing. In an embodiment, the dispersion may be combined and mixed in a rotational mixer. In this manner, the nanoparticles are uniformly distributed among the polymer chains in the open cell foam.

Figure 2:
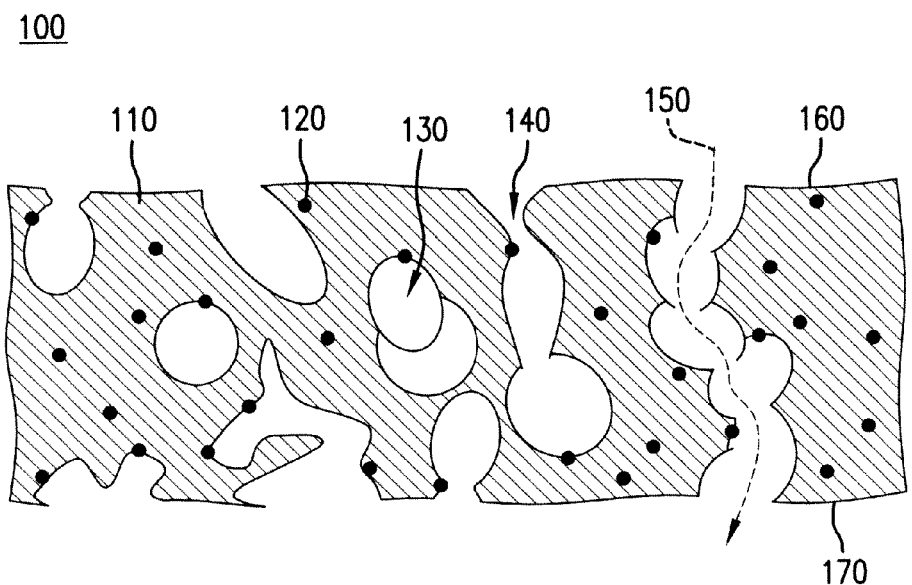
FIG. 2 shows a cross-section of an open cell foam.

FIG. 2 shows a cross-section of an open cell foam 100. The open cell foam 100 includes a base polymer matrix 110 and nanoparticles 120 distributed throughout the matrix 110 and exposed by pores 130 that are interconnected by flow channels 140. Although the cross-section shown in FIG. 2 only has a limited number of pores 130 that interconnect, the open cell foam 100 includes a network of interconnected pores 130 that establish numerous flow paths 150 (represented by the dotted curve with an arrow indicating flow direction) across the open cell foam 100 from a first surface 160 to a second surface 170.

According to an embodiment, the size of the pores of the open cell foam is determined by the particle size of the nanoparticles. As used herein, "size of the pores" refers to the largest particle that can be accommodated by the pore. In a non-limiting embodiment, the size of the pores is about 75 µm to about 1000 µm, more specifically about 75 µm to about 850 µm, and more specifically about 75 µm to about 500 µm. Thus, the open cell foam filters particles due to size. In an embodiment, the open cell foam excludes traversal across the open cell foam of particles having a size of greater than 1000 µm, more specifically greater than 500 µm, and more specifically greater than about 50 µm. In another embodiment, the open cell foam allows traversal across the open cell foam of particles having a size of less than or equal to 1000 µm, more specifically less than or equal to 500 µm, even more specifically less than or equal to 100 µm, and even more specifically less than or equal to 0.5 µm.

In an embodiment, the flow rate of fluid across the open cell foam is determined by functional groups attached to the nanoparticles. It will be appreciated that the flow rate is a function of other parameters such as the pore size, geometry of flow paths (which can include linear paths as well as curved paths), liquid viscosity, and the like. In a non-limiting embodiment, the flow rate of fluid through the open cell foam is about 0.5 liter per minute (LPM) to about 7500 LPM, specifically about 1 LPM to about 6000 LPM, more specifically about 1 LPM to about 5000 LPM, and even more specifically about 1 LPM to about 2500 LPM. In particular, the pores of the open cell foam selectively transmit fluids but block flow of particles. Due to the pore density of the open cell foam, even though particles may block certain flow paths through the open cell foam, the flow rate of the open cell foam is maintained at a high value.

With respect to fluid absorption, the functional groups of the derivatized nanoparticles mediate the fluid absorption behavior of the open cell foam. In an embodiment, the nanoparticles, exposed in the pores of the open cell foam, are derivatized with functional groups to selectively transmit non-polar fluids but selectively inhibit transmission of polar fluids through the open cell foam. In a further embodiment, the nanoparticles, exposed in the pores of the open cell foam, are derivatized with functional groups to selectively transmit polar fluids through the downhole filter and selectively inhibit transmission of non-polar fluids through the downhole filter. Although polar and non-polar fluids are specifically mentioned, it will be appreciated that the functional groups of the nanoparticles provide the nanoparticle with surface properties such that the nanoparticles are hydrophilic, hydrophobic, olepholic, olephobic, oxophilic, lipophilic, or a combination of these properties. Thus, the functional groups on the nanoparticles control the selective absorption and transmission of fluids based on these properties. By way of a non-restrictive embodiment, the nanoparticles are hydrophilic and allow flow of aqueous fluids through the open cell foam while inhibiting flow of hydrocarbons.

Figure 3A:
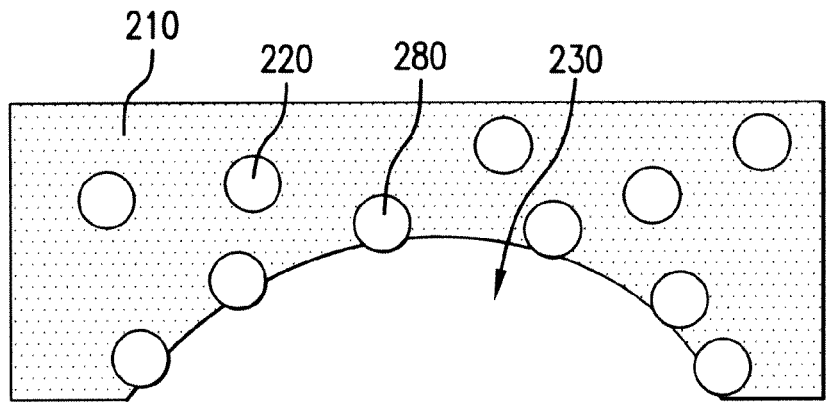
FIGS. 3A-3C show cross-sections of open cell foams having nanoparticles therein.
Figure 3B:
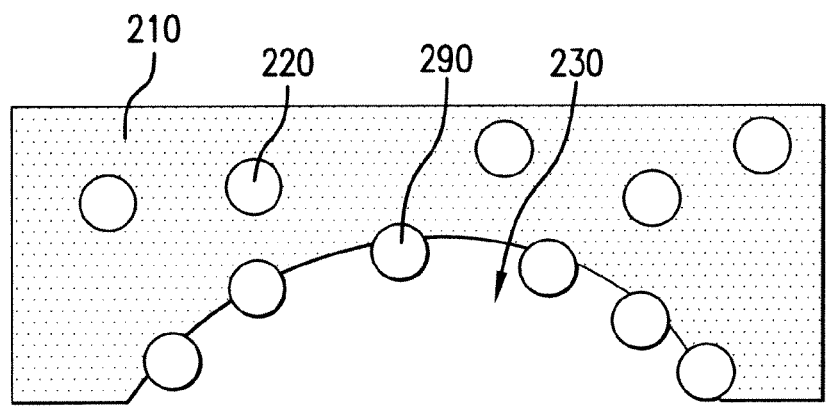
Figure 3C:
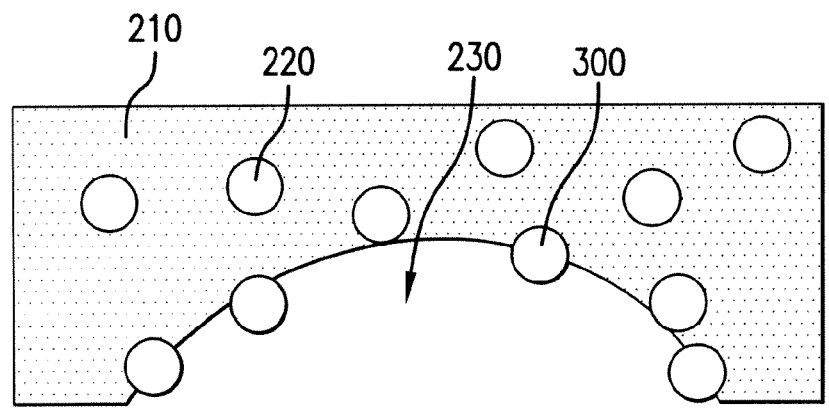

FIGS. 3A-3C show the effect of derivatization on the exposure of the nanoparticle within the pores of the open cell foam. Variation of the amount of exposure of the nanoparticles within the pores can affect the size of the pores and selectivity of the pores for fluid absorption and particulate matter filtration. FIG. 3A shows derivatized nanoparticles 220 among a base polymer matrix 210 and derivatized nanoparticles 280 exposed within a pore 230 of an open cell foam. Here, the derivatized nanoparticles 280 are exposed to a small extent, for example, only 20% of the total surface area of the nanoparticle 280 may be present within the pore 230. FIG. 3B shows derivatized nanoparticles 290 that are exposed to a greater extent, for example, 80% of the total surface area of the nanoparticle 290 may be present within the pore 230. FIG. 3C shows a case where derivatized nanoparticles 300 are distributed such that, on average, 50% of the surface area of the nanoparticles 300 is exposed in the pores 230. The relative exposure of the nanoparticles within the pores of the open cell foam can be determined by selection of the functional group attached to the derivatized nanoparticles. When the functional groups interact strongly with the base polymer matrix, a smaller amount of the surface area of the nanoparticles are exposed within the pores as compared with embodiments where the functional groups interact less strongly with the base polymer matrix so that a greater amount of the surface area of the nanoparticles are exposed within the pores of the open cell foam. It is believed that the flow rate of a particular fluid through the open cell foam depends on the absolute number of nanoparticles exposed in the pores of the open cell foam as well as the amount of the surface area exposed in the pores. Due to the interaction time of the fluid with the nanoparticles within the pores, the flow rate can vary. Consequently, a highly effective and selective fluid and particle filter is constructed from the open cell foam.

While one or more embodiments have been shown and described, modifications and substitutions may be made thereto without departing from the spirit and scope of the invention. Accordingly, it is to be understood that the present invention has been described by way of illustrations and not limitation. For example, different nanoparticles may have different shapes, relative sizes, etc. than those shown. For example, nanoclay has a plate-like structure with a thickness of about 1 nm and a diameter of about 20-1000 nm, nanotubes are tube shaped having a diameter of about 10-50 nm and a length measurable on the scale of microns, etc.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A system for separating fluids of a fluid mixture comprising:
   a filter element operatively arranged for enabling a first fluid component of a fluid mixture to flow therethrough while impeding flow of at least one other fluid component of the fluid mixture, the filter element comprising a fluoropolymer foam, the filter element including a first affinity for passing hydrocarbon based fluid component of the fluid mixture and a second affinity for inhibiting passage of water-based fluid component of the fluid mixture; and
   an additive configured to improve the first affinity of the filter element for passing hydrocarbon based fluid component of the fluid mixture relative to the second affinity of the filter element for inhibiting passage of water-based fluid component of the fluid mixture of the fluid mixture.

2. The system of claim 1, wherein the hydrocarbon based fluid component comprises a gas.

3. The system of claim 1, wherein the filter element comprises ETFE, PFA, PVDF, PCTFE, FEP, ECTFE, PTFE, or a combination including at least one of the foregoing.

4. The system of claim 1, wherein the fluoropolymer is blended with an additional polymer for modifying properties of the filter element.

5. The system of claim 4, wherein the additional polymer includes PPS, PPSU, PEEK, polyimide, or a combination including at least one of the foregoing.

6. The system of claim 1, wherein the filter element is an open cell foam.

7. The system of claim 6, wherein the additive comprises nanoparticles disposed in the open cell foam and exposed within pores of the open cell foam.

8. The system of claim 7, wherein the nanoparticles comprise a fullerene, nanotubes, nano graphite, nanographene, graphene fiber, polysilsesquioxanes, silica nanoparticles, nanoclay, nanodiamonds, metal particles, ceramic particles, or a combination including at least one of the foregoing.

9. The system of claim 8, wherein the nanoparticles comprise nanoclay modified with quaternary ammonium salt for adjusting hydrophobicity of the filter element.

10. The system of claim 7, wherein the nanoparticles are derivatized with functional groups to selectively impede non-polar fluids through the filter element.

11. The system of claim 7, wherein the nanoparticles are derivatized with functional groups to selectively impede polar fluids through the filter element.

12. The system of claim 6, wherein open cell foam further comprises a filler including carbon black, mica, clay, glass fiber, carbon fiber, or a combination comprising at least one of the foregoing fillers.

13. The system of claim 1, further comprising an injection line, the additive comprising at least one chemical injected by the line into the fluid mixture.

14. The system of claim 13, wherein the at least one chemical alters a surface tension of one of the hydrocarbon based fluid component and the water based fluid component of the fluid mixture.

15. The system of claim 1, wherein the additive reduces the second affinity.

16. The system of claim 1, wherein the additive increases the first affinity.

17. A method of separating fluids comprising:
   disposing a filter element in a downhole fluid mixture including a hydrocarbon based fluid component and water based fluid component;
   modifying the filter element to adjust a relative difference between a first affinity of the filter element for passing the hydrocarbon based fluid component and a second affinity of the filter element for inhibiting passage of the water based fluid component; and
   flowing the hydrocarbon based fluid component through the filter element while impeding passage of the water based fluid component therethrough for separating the hydrocarbon based fluid component from the fluid mixture.

18. The method of claim 17, wherein the modifying of the relative difference is achieved by use of an additive.

19. The method of claim 17, wherein the filter element comprises an open cell foam and the additive comprises nanoparticles disposed in the open cell foam and exposed within pores of the open cell foam.

20. The method of claim 19, wherein the nanoparticles comprise a fullerene, nanotubes, nanographite, nanographene, graphene fiber, polysilsesquioxanes, silica nanoparticles, nano-clay, nanodiamonds, metal particles, ceramic particles, or a combination including at least one of the foregoing.

21. The method of claim 18, wherein the additive comprises at least one chemical injected by an injection line into the fluid mixture.

22. The method of claim 21, wherein the at least one chemical alters a surface tension of the fluid mixture.

23. The method of claim 17, wherein the additive reduces the second affinity, increases the first affinity, or combinations including at least one of the foregoing.

24. The method of claim 17, wherein the hydrocarbon based fluid component is comprises a gas.

25. A system for separating fluids of a fluid mixture comprising:

a filter element operatively having a first affinity arranged for enabling a hydrocarbon based component of a fluid mixture to flow therethrough and a second affinity for impeding flow of a water based fluid component of the fluid mixture;

an additive configured to improve the first affinity of the filter element relative to the second affinity of the filter element; and an injection line, the additive comprising at least one chemical injected by the injection line into the fluid mixture.

* * * * *